Nov. 25, 1969 — E. L. STARLING — 3,480,296
TRAILER HITCH
Filed Nov. 30, 1967
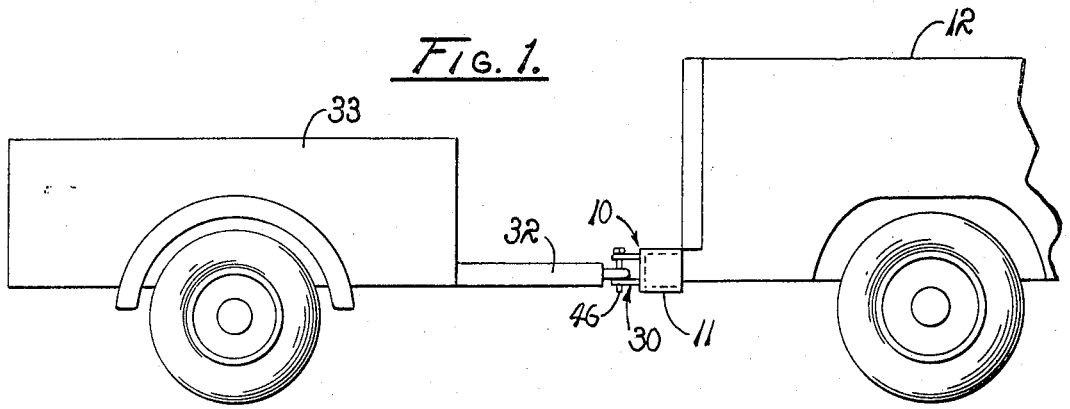
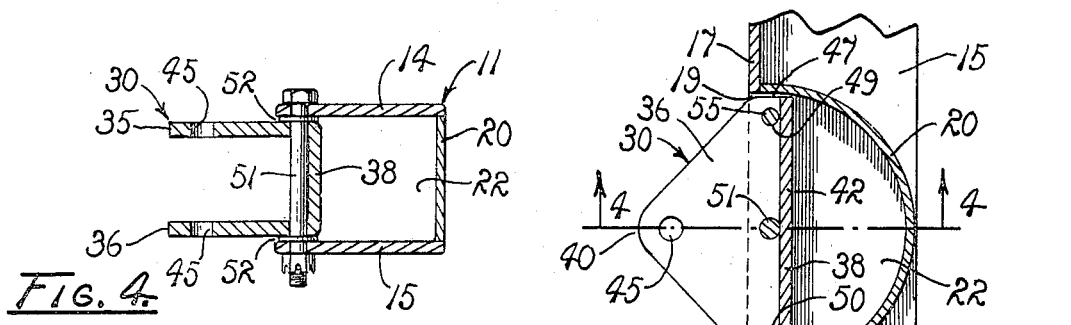
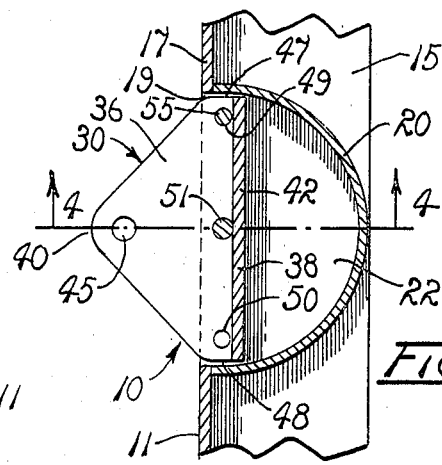
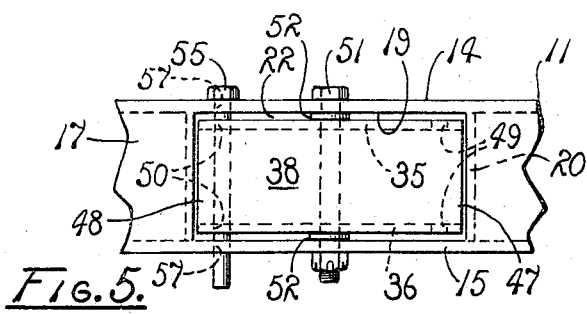
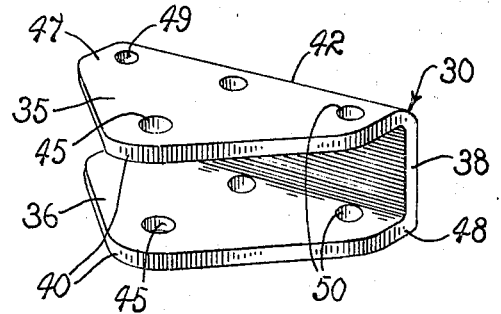
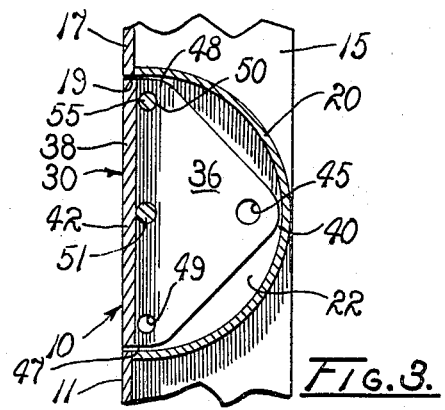
EDWARD L. STARLING
INVENTOR
Huebner & Worrel
ATTORNEYS

United States Patent Office 3,480,296
Patented Nov. 25, 1969

3,480,296
TRAILER HITCH
Edward L. Starling, Tulare, Calif., assignor of one-half to Nichols Farms, a corporation of California
Filed Nov. 30, 1967, Ser. No. 687,002
Int. Cl. B60d *1/02;* B60r *21/00*
U.S. Cl. 280—491                                                                                                  5 Claims

ABSTRACT OF THE DISCLOSURE

A trailer hitch for mounting in a vehicle bumper or the like providing a drawbar pivotally mounted within a recess in the bumper for swinging movement between a a draft position outwardly extended from the bumper and a position with the drawbar fully retracted within the recess in the bumper to present a clean, uncluttered bumper surface.

BACKGROUND OF THE DISCLOSURE

Conventional trailer hitches are usually mounted in rearwardly permanently extended relation from the rear bumpers of draft vehicles such as pickup trucks, station wagons, passenger automobiles, and the like. When not in use, such hitches provide a cluttered, obtrusive appearance and constitute a safety hazard. In attempting to solve the problems presented by such conventional trailer hitches, the prior art devices have included mounting structures disposed in suspended relation from the frame of the vehicle below the rear bumper. The drawbar of the hitch is connected by extensive supports and usually complicated linkages frequently to permit extension and retraction of the drawbar with respect to the bumper during connection to a trailing vehicle. These devices have been found to be subject to damage from obstructions encountered during movement of the vehicle over unimproved roadways and the like when disposed in such exposed position beneath the frame. Such devices also frequently require a substantial amount of tedious stooping and bending by the operator when manipulating the drawbar for effecting a connection between the draft and trailing vehicles.

SUMMARY OF THE INVENTION

Accordingly, it is an object of the present invention to provide an improved trailer hitch for connecting trailing and draft vehicles.

Another object is to provide such an improved trailer hitch having a minimum of manipulatable elements for ease and convenience of operation.

Another object is to provide a trailer hitch of the character described which can be mounted on a vehicle bumper and which presents a substantially smooth, uncluttered bumper surface when not in use.

Another object is to provide an improved trailer hitch which is mounted on the rear bumper of a draft vehicle and which is capable of being fully retracted in shielded relation within the bumper when not in use.

Other objects and advantages of the present invention will become more readily apparent upon reference to the drawing and the description in the specification.

BRIEF DESCRIPTION OF THE DRAWING

FIG. 1 is a side elevation of the trailer hitch of the present invention shown mounted on the rear bumper of a draft vehicle providing a drawbar for connection between the draft vehicle and a trailing vehicle.

FIG. 2 is a somewhat enlarged top plan view of the trailer hitch drawbar shown in its rearwardly extended operating position of FIG. 1.

FIG. 3 is a top plan view similar to FIG. 2 but showing the drawbar in a fully retracted position.

FIG. 4 is a somewhat enlarged transverse vertical section through the drawbar and bumper, taken on line 4—4 of FIG. 2.

FIG. 5 is a face view of the hitch shown in its fully retracted position of FIG. 3.

FIG. 6 is a perspective view of the drawbar removed from the bumper of the draft vehicle.

DESCRIPTION OF THE PREFERRED EMBODIMENT

Referring more particularly to the drawing, a trailer hitch embodying the principles of the present invention is generally indicated by the reference numeral 10 and is shown mounted on the rear bumper 11 of a draft vehicle 12. The draft vehicle may be of any suitable type of prime mover and is exemplified in the drawing as a pickup truck with the rear bumper 11 being of the usual box-section construction having oppositely spaced substantially parallel upper and lower walls 14 and 15, respectively, interconnected by a continuous rear wall 17. For the purposes of the present invention, the rear wall has an elongated substantially rectangular opening 19 cut or otherwise formed therein. The opening is located substantially centrally of the bumper and in symmetrical relation to the longitudinal center line of the draft vehicle 12. An arcuate wall 20 is disposed within the bumper inwardly of the opening 19 to form a semi-circular pocket or recess 22 with the wall secured in such position as by welding or the like to the rear wall 17 and the upper and lower walls 14 and 15, respectively, of the bumper.

The trailer hitch 10 of the present invention provides a retractable drawbar 30 for effecting connection between the draft vehicle 12 and the forwardly extending tongue 32 of a trailer 33, as shown in FIG. 1. The drawbar is formed of a heavy gauge steel channnular member which, as best shown in FIGS. 4 and 6, is U-shaped in cross section to provide opposite upper and lower plates 35 and 36, respectively, interconnected by a continuous bight portion 38. As best shown in the plan views of FIGS. 2 and 3, the upper and lower plates are constructed substantially in the form of a right triangle having an apex 40 and an opposite substantially straight base 42 coextensive with the bight portion 38. As best shown in FIG. 6, the upper and lower plates 35 and 36 individually include aligned bores 45 at the apex 40 for receiving a trailer connecting draft pin 46 therethrough. The base 42 has opposite ends 47 and 48 with the plates respectively providing aligned bores 49 and 50 adjacent to the opposite ends of the base.

The drawbar 30 is pivotally mounted for rotation within the recess 22 in the bumper 11 by an elongated pivot bolt 51 extended between the upper and lower walls 14 and 15, respectively, and through the drawbar closely adjacent to its base 42 midway between the opposite ends 47 and 48 thereof. Thrust washers 52 are disposed about the pivot bolt axially to center the drawbar between the upper and lower walls of the bumper permitting the drawbar free rotation within the recess 22. As best shown in FIG. 5, a drawbar locking pin 55 is extended through a pair of aligned bores 57 in the upper and lower walls 14 and 15, respectively, of the bumper for selective extension through the bores 49 and 50 in the drawbar.

OPERATION

The operation of the described embodiment of the subject invention is believed to be clearly apparent and is briefly summarized at this point. As best shown in FIGS. 3 and 5, the drawbar 30 of the trailer hitch 10 of the present invention is disposed in its fully retracted position within the recess 22 when not in use. The drawbar is constrained in such position by extension of the locking bolt 55 through the bores 57 and through the bores 50 in the drawbar. In such stored, retracted position of the drawbar, it is noted that the base 42 and the bight portion 38 are disposed in substantially flush relation with the rear wall 17 of the bumper 11, thus providing a relatively clean, uncluttered bumper surface.

When it is desired to connect a trailing vehicle such as the trailer 33 to the draft vehicle 12, the pin 55 is removed from the bores 57 in the bumper 11. A slight inward force is then directed against either end of the base 42 of the drawbar 30 to rotate the same about the pivot bolt 51 for swinging the apex 40 rearwardly outwardly from the recess to the position shown in FIGS. 2 and 4. The connecting end of the trailer tongue 32 is then positioned between the upper and lower plates 35 and 36 of the drawbar with the bore in the tongue aligned with the draft pin bores 45 in the drawbar for receiving therethrough the draft pin 46 in connecting relation. It will be noted that such connection can be easily accomplished even if the tongue 32 of the trailer is not precisely positioned with respect to the draft vehicle by manipulation of the drawbar transversely of the bumper by swinging movement about its pivot bolt 51. If the connection is accomplished with the trailer and draft vehicle disposed in such misaligned relation, the draft vehicle is moved ahead sufficiently to permit the trailer automatically to be straightened therebehind in order to align the bore 49 in the drawbar with the lock pin bores 57 in the bumper. The lock pin 55 is then reinserted through the aligned bores 49 and 57 dependably to hold the drawbar in its operating draft position.

After use, the trailer can be quickly and conveniently disconnected from the draft vehicle by first removing the drawbar locking pin 55 from the bumper 11. Such removal frees the drawbar for rotation in order to insure safe, convenient removal of the drawbar pin 46 which movement eliminates any jamming or binding of the draft pin between the trailer tongue 32 and the drawbar. The drawbar is then rotated approximately 180° to dispose the apex 40 inwardly of the recess 22 so that the bore 50 is again aligned with the lock pin bores 57 in the bumper. The locking pin 55 is reinserted through the aligned bores dependably to hold the drawbar in its fully retracted position within the recess 22 of the bumper and in the previously described flush relation with the rearward surface of the rear wall 17 of the bumper.

In view of the foregoing, it is readily apparent that the structure of the present invention provides an improved trailer hitch which permits complete retraction of the drawbar within the bumper of the draft vehicle to present a substantially smooth, uncluttered rear bumper surface. It is further noted that the structure of the present invention enables quick, convenient coupling of a trailing vehicle to the draft vehicle which does not require precise positioning of the prime mover in relation to the vehicle to be towed. During a subsequent uncoupling operation, the hitch eliminates any jamming or binding of the draft pin to permit the latter quick and convenient removal from the drawbar.

Although the invention has been herein shown and described in what is conceived to be the most practical and preferred embodiment, it is recognized that departures may be made therefrom within the scope of the invention.

Having described my invention, what I claim as new and desire to secure by Letters Patent is:

1. A trailer hitch, for a vehicle bumper having an outer surface with a recess formed therein, comprising a drawbar pivotally mounted within the recess of the bumper for swinging movement between a draft position outwardly extended from the bumper and a retracted position with the drawbar disposed completely within the recess and providing a surface disposed in substantially flush relation with said outer surface of the bumper and in blocking substantially filling relation to the recess when the drawbar is disposed within the bumper.

2. The trailer hitch of claim 1 in which said drawbar is substantially triangular and has an apex portion providing a draft pin receiving bore extendible from the bumper in said draft position of the drawbar, and a substantially flat base portion disposable in substantially flush relation with the outer surface of the bumper when the drawbar is in said retracted position.

3. The trailer hitch of claim 2 wherein said base portion of the drawbar has opposite ends, and a pivot bolt supported by the bumper is extended through the drawbar adjacent to said base portion intermediate its ends.

4. The trailer hitch of claim 3 in which said drawbar has a pair of spaced bores individually disposed adjacent to said opposite ends of the base portion, and drawbar locking means supported on the bumper with said bores in the drawbar being selectively alignable with said locking means in said draft and retracted positions.

5. In combination with a vehicle bumper providing a substantially flat outer surface having a recess formed therein and opposite upper and lower walls having aligned bores therethrough on an axis extended through the recess, a trailer hitch providing a drawbar having spaced upper and lower plates substantially in the form of a right triangle disposed within said recess and having an apex providing a draft pin receiving bore therethrough and an opposite base providing opposite ends, said plates individually including spaced lock pin receiving bores therethrough adjacent to said opposite ends; a pivot bolt extended between said upper and lower walls of the bumper through said recess and through the drawbar adjacent to said base intermediate its ends pivotally mounting the drawbar within the recess for swinging movement between a draft position with said apex outwardly extended from the bumper and a retracted position with the base disposed substantially flush with said outer surface of the bumper, said lock pin receiving bores in the drawbar being individually alignable with said bores in the bumper when the drawbar is disposed in its draft and retracted positions; and a lock pin extendible through said aligned bores releasable to hold said drawbar in said selected positions.

References Cited

UNITED STATES PATENTS

| | | | |
|---|---|---|---|
| 2,527,155 | 10/1950 | Schlenz | 280—491 |
| 2,717,164 | 9/1955 | Meyer | 280—491 |

LEO FRIAGLIA, Primary Examiner

U.S. Cl. X.R.

280—500; 293—69